J. H. GUGLER.
COMBINED PRIMARY AND SECONDARY BATTERY SYSTEM.
APPLICATION FILED NOV. 6, 1909.
979,154.
Patented Dec. 20, 1910.
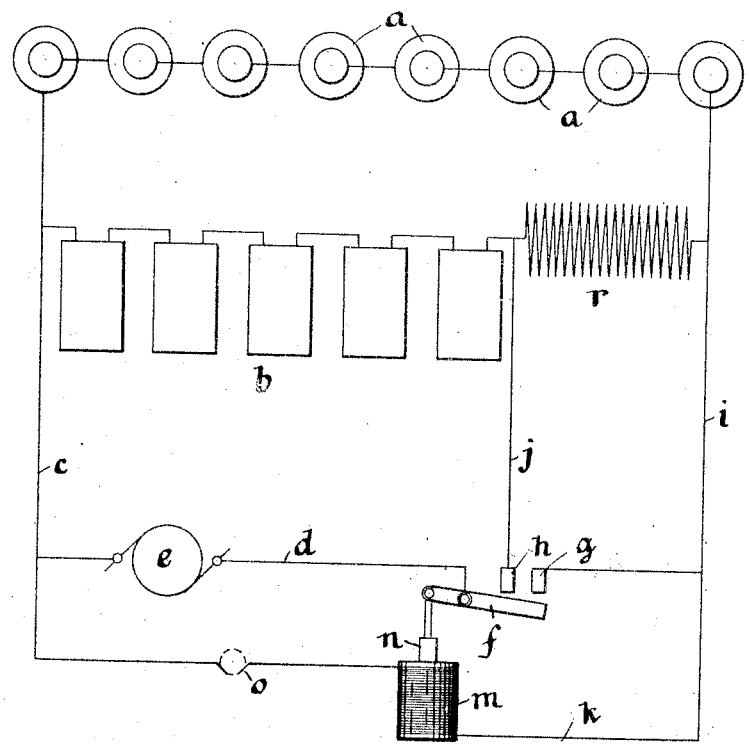

UNITED STATES PATENT OFFICE.

JULIUS H. GUGLER, OF MILWAUKEE, WISCONSIN.

COMBINED PRIMARY AND SECONDARY BATTERY SYSTEM.

979,154.   Specification of Letters Patent.   Patented Dec. 20, 1910.

Application filed November 6, 1909. Serial No. 526,668.

*To all whom it may concern:*

Be it known that I, JULIUS H. GUGLER, of Milwaukee, Wisconsin, have invented a Combined Primary and Secondary Battery System, of which the following is a specification.

This invention has relation to battery systems for generating power, and the object I have in view is to devise an arrangement to enable a primary battery to be utilized with improved economy and especially in connection with an auxiliary secondary battery.

Primary batteries of the two-fluid type are subject to rapid deterioration with time through osmose through the porous cell, which causes a mingling of the two fluids and consequently deterioration. Hence it is desirous in those cases where batteries are used only part of the time to provide some means whereby currents can be continually drawn from them and stored up, and this is done by placing a secondary battery in parallel therewith.

Heretofore primary batteries have been arranged to supply a power-circuit in conjunction with secondary batteries which equalize their potential, but I aim to improve on the usual arrangement in a manner which will enable a smaller size of secondary battery to be utilized with nearly equal economy.

The invention is especially adaptable to cases where the use of the battery is intermittent, as for example, in the operation of self-playing musical instruments and amusement devices of like character.

For the better understanding of my invention I have illustrated the arrangement constituting my invention in the accompanying drawing, reference being had to the following description thereof.

In this drawing, $a$ represents a primary battery which may consist of any number of cells, and $b$ a secondary battery of a suitable number of cells to make its potential substantially equal to that of the primary battery, but it will be of course understood that the potential of the battery $b$ rises to approximate equality to the battery $a$ as it becomes charged by the latter and falls again as it is discharged. The same pole of both batteries is connected by a lead $c$ to one terminal of the service-circuit $d$, in which may be any current-consuming device, illustrated symbolically as a motor $e$. The other terminal of said circuit $d$ is permanently connected to the blade $f$ of a switch, which has two terminals $g$ and $h$ connected by leads $i$ and $j$ to the other poles of the batteries $a$ and $b$ respectively; so that when the switch-blade $f$ is closed, both batteries are connected in parallel with the circuit $d$. Moreover the two leads $i$ and $j$ are permanently connected together by a resistance $r$. The switch-blade $f$ is here shown as electromagnetically operated by a solenoid $m$ having a core $n$ connected with the blade $f$; said solenoid being in a branch-circuit $k$ connected to the batteries and having a coin-operated switch $o$ in series therewith whereby the depositing of a coin in the receptacle, as usually provided in self-playing pianos and the like, will cause the switch $f$ to be closed and the motor $e$ to operate; but the construction of the switch $o$ forms no part of this present invention.

The arrangement is such that, when the circuit is closed, both batteries are in parallel and the resistance $r$ is short-circuited, but when the circuit is opened the resistance $r$ limits the current which can be supplied by the battery $a$ and thus prevents unnecessary overcharging of the secondary battery and waste of power.

By providing the contact $g$ I gain the advantage among others that the primary battery is always available for maximum service at all times independently of the condition of the secondary battery; for example when a newly charged primary battery is placed in circuit at a time when the secondary battery is fully discharged. In such condition all the current will of course be drawn from the primary battery as long as the motor is turned on, and when the latter is disconnected the current will continue to flow through the primary battery and charge the secondary.

Having thus described my invention, what I claim as new and desire to secure by Letters Patent, is:

1. The combination of a primary battery, a secondary battery and a service-circuit all connected together at one pole of each, a switch adapted to connect together the other poles of said three elements, and a resistance connecting the last-named poles of the two batteries.

2. The combination of a primary battery, a secondary battery, and a service-circuit, one pole of each of said three elements being disconnected from the other two except as hereinafter stated, a device adapted to connect said three poles together, and a resistance permanently connecting said disconnected pole of the primary battery with said disconnected pole of the secondary battery; the other pole of said primary and secondary battery being permanently connected and the other pole of said service-circuit being connected thereto when said first-named poles are connected together.

3. The combination of a primary battery, a secondary battery one pole of which is permanently connected to the corresponding pole of said primary battery, a resistance permanently connecting the other poles of the two batteries, a service-circuit, and a device adapted to connect said service-circuit in circuit with said batteries and simultaneously short-circuit said resistance.

4. The combination of a primary battery, a secondary battery one pole of which is permanently connected to the corresponding pole of said primary battery, a resistance permanently connecting the other poles of the two batteries, a service-circuit, and a device adapted to connect said service-circuit in circuit with said batteries and simultaneously short-circuit said resistance; in conjunction with an electromagnetic device adapted to operate said first-named device, a branch-circuit connected with said batteries and including said electromagnetic device, and a switch in said branch-circuit.

In witness whereof I have hereunto set my hand this 1st day of November, 1909.

JULIUS H. GUGLER.

Witnesses:
J. C. PETERSON,
ALICE J. LEAMAN.